US010531090B1

(12) United States Patent
Li et al.

(10) Patent No.: US 10,531,090 B1
(45) Date of Patent: Jan. 7, 2020

(54) METHOD AND APPARATUS FOR VIDEO CODING

(71) Applicant: Tencent America LLC, Palo Alto, CA (US)

(72) Inventors: Guichun Li, Milpitas, CA (US); Xiaozhong Xu, State College, PA (US); Xiang Li, Los Gatos, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/222,626

(22) Filed: Dec. 17, 2018

Related U.S. Application Data

(60) Provisional application No. 62/693,055, filed on Jul. 2, 2018.

(51) Int. Cl.
| | |
|---|---|
| *H04N 19/105* | (2014.01) |
| *H04N 19/139* | (2014.01) |
| *H04N 19/129* | (2014.01) |
| *H04N 19/44* | (2014.01) |
| *H04N 19/176* | (2014.01) |

(52) U.S. Cl.
CPC ......... *H04N 19/129* (2014.11); *H04N 19/105* (2014.11); *H04N 19/139* (2014.11); *H04N 19/176* (2014.11); *H04N 19/44* (2014.11)

(58) Field of Classification Search
CPC ............................ H04N 19/105; H04N 19/139
USPC ...................................... 375/240.16
See application file for complete search history.

(56) References Cited

U.S. PATENT DOCUMENTS

| | | | | |
|---|---|---|---|---|
| 2007/0237226 A1* | 10/2007 | Regunathan | ......... | H04N 19/567 375/240.12 |
| 2010/0014001 A1* | 1/2010 | Nakazato | ............... | H04N 19/56 348/699 |
| 2014/0301461 A1* | 10/2014 | Jeon | ........................ | H04N 19/52 375/240.12 |
| 2017/0332099 A1* | 11/2017 | Lee | ...................... | H04N 19/122 |
| 2018/0359483 A1* | 12/2018 | Chen | ...................... | H04N 19/52 |

OTHER PUBLICATIONS

High Efficiency Video Coding (HEVC), Rec. ITU-T H.265 and ISO/IEC 23008-2, Dec. 2016.

* cited by examiner

*Primary Examiner* — Jeffery A Williams
(74) *Attorney, Agent, or Firm* — Oblon, McClelland, Maier & Neustadt, L.L.P.

(57) ABSTRACT

Aspects of the disclosure provide method and apparatus for video encoding/decoding. In some examples, an apparatus for video decoding includes receiving circuitry and processing circuitry. The processing circuitry decodes prediction information for a block in a current picture that is a part of a coded video bitstream. The prediction information is indicative of an inter prediction mode. In response to the inter prediction mode, the processing circuitry constructs a candidate list of candidate motion vector predictors in a ranking order that are sorted based on statistics of motion information in a spatial neighboring region of the block. The processing circuitry then determines, a motion vector predictor from the candidate list following the ranking order, and reconstructs samples of the block according to motion information associated with the determined motion vector predictor.

18 Claims, 16 Drawing Sheets

METHOD AND APPARATUS FOR VIDEO CODING

INCORPORATION BY REFERENCE

This present disclosure claims the benefit of priority to U.S. Provisional Application No. 62/693,055, "METHODS FOR RANKING-BASED SPATIAL MERGE CANDIDATE LIST FOR INTERPICTURE PREDICTION" filed on Jul. 2, 2018, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p 60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide method and apparatus for video encoding/decoding. In some examples, an apparatus for video decoding includes receiving circuitry and processing circuitry. The processing circuitry decodes prediction information for a block in a current picture that is a part of a coded video bitstream. The prediction information is indicative of an inter prediction mode. In response to the inter prediction mode, the processing circuitry constructs a candidate list of candidate motion vector predictors in a ranking order that are sorted based on statistics of motion information in a spatial neighboring region of the block. The processing circuitry then determines, a motion vector predictor from the candidate list following the ranking order, and reconstructs samples of the block according to motion information associated with the determined motion vector predictor.

According to an aspect of the disclosure, the processing circuitry scans neighboring blocks in the spatial neighboring region to collect the statistics of the motion information in the spatial neighboring region.

In an example, the processing circuitry scans minimum-size blocks in the spatial neighboring region to collect the statistics of the motion information in the spatial neighboring region. For example, the processing circuitry scans minimum-size blocks that are adjacent to the block to collect the statistics of the motion information in the spatial neighboring region.

In an embodiment, the processing circuitry scans first minimum-size blocks that are located in a left column next to the block and are extended in a bottom-left direction to collect the statistics of the motion information in the spatial neighboring region, and scans second minimum-size blocks that are located in an upper row next to the block and are extended in an above-right direction to collect the statistics of the motion information in the spatial neighboring region.

In another embodiment, the processing circuitry scans first minimum-size blocks that are located in multiple left columns next to the block and are extended in a bottom-left direction to collect the statistics of the motion information in the spatial neighboring region, and scans second minimum-size blocks that are located in multiple upper rows next to the block and are extended in an above-right direction to collect the statistics of the motion information in the spatial neighboring region.

In another embodiment, the processing circuitry scans representative minimum-size blocks respectively in grid units that are adjacent to the block to collect the statistics of the motion information in the spatial neighboring region.

In another embodiment, the processing circuitry scans first representative minimum-size blocks respectively in first grid units that are located in a left column next to the block and are extended in a bottom-left direction to collect the statistics of the motion information in the spatial neighboring region, and scans second representative minimum-size blocks respectively in second grid units that are located in an upper row next to the block and are extended in an above-right direction to collect the statistics of the motion information in the spatial neighboring region.

In another embodiment, the processing circuitry scans first representative minimum-size blocks respectively in first grid units that are located in multiple left columns next to the block and are extended in a bottom-left direction to collect the statistics of the motion information in the spatial neighboring region, and scans second representative minimum-size blocks respectively in second grid units that are located in multiple upper rows next to the block and are extended in an above-right direction to collect the statistics of the motion information in the spatial neighboring region.

According to an aspect of the disclosure, the processing circuitry constructs a histogram of the motion information in the spatial neighboring region according to the statistics, and sorts motion vector predictors from the spatial neighboring region into the ranking order according to the histogram. In an embodiment, the processing circuitry constructs the histogram with bins corresponding to individual motion vectors. In another embodiment, the processing circuitry constructs the histogram with bins corresponding to ranges of motion vectors.

In some examples, the processing circuitry selects a portion of sorted the motion vector predictors based on rankings in the ranking order.

In some embodiments, the processing circuitry constructs the candidate list of candidate motion vector predictors in the ranking order when the block satisfies at least one of a width requirement and a height requirement.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
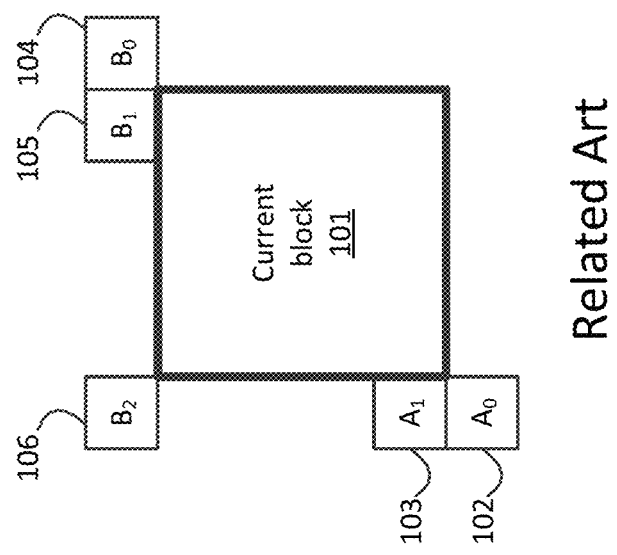
FIG. 1 is a schematic illustration of a current block and its surrounding spatial merge candidates in accordance with H.265.
Figure 2:
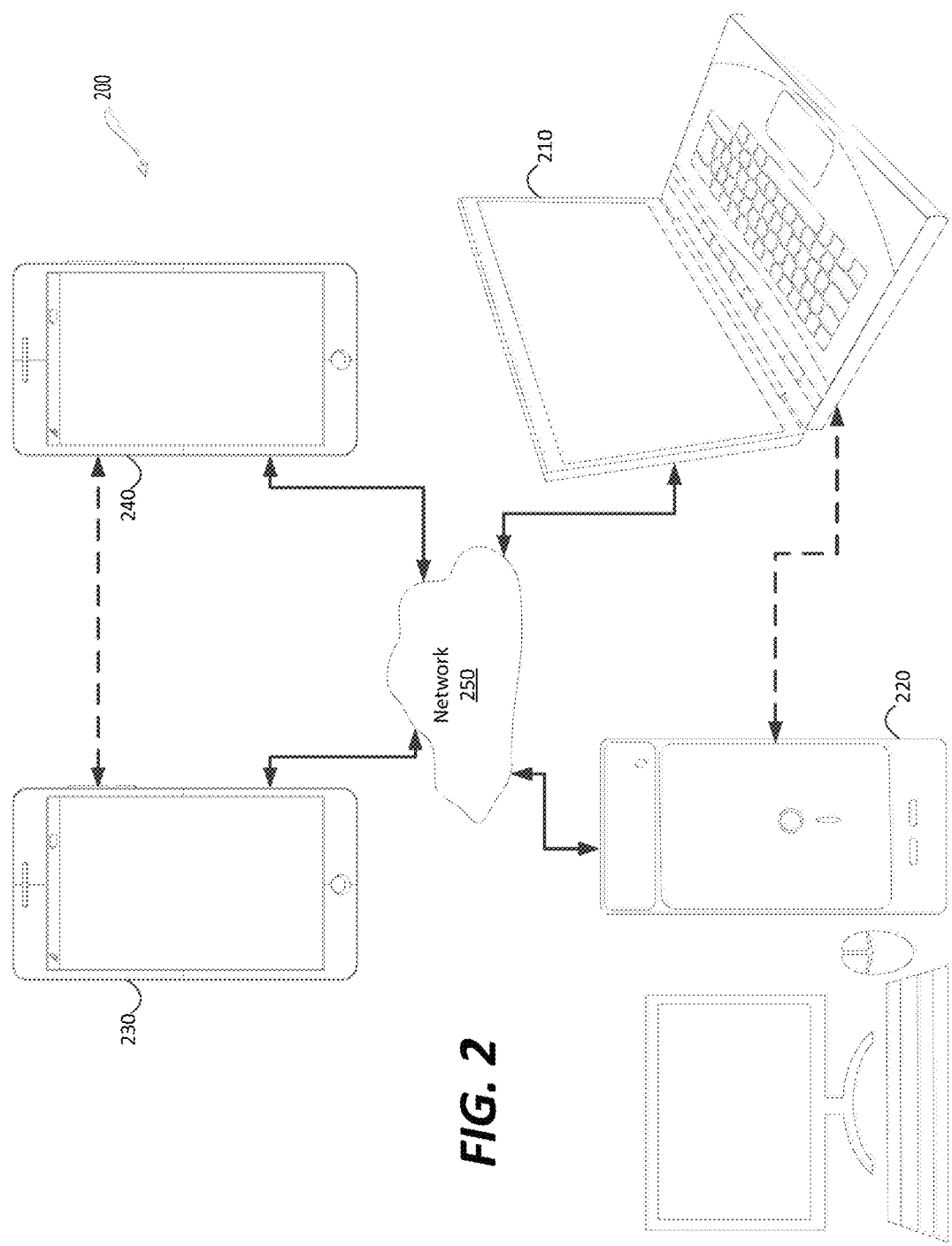
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
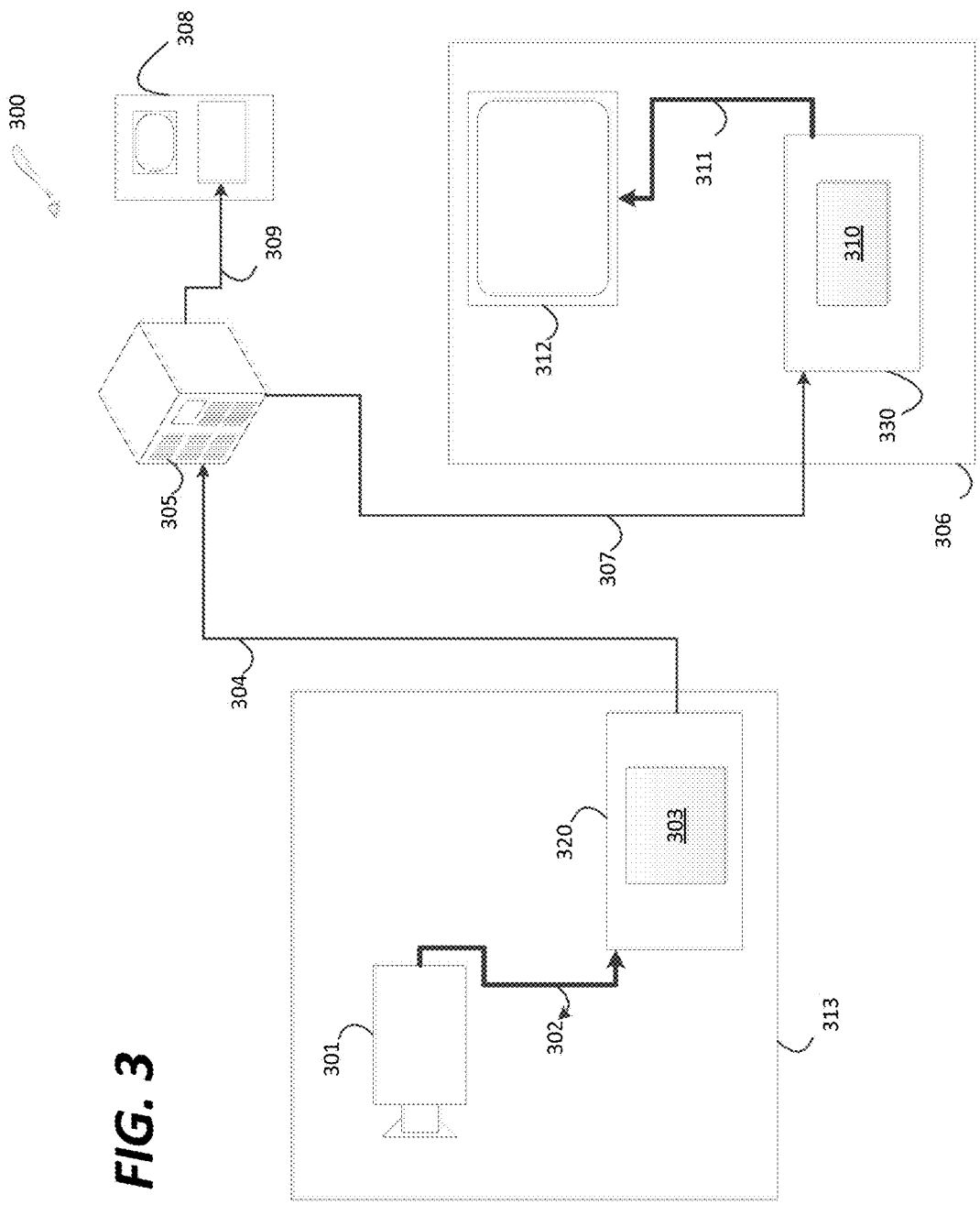
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
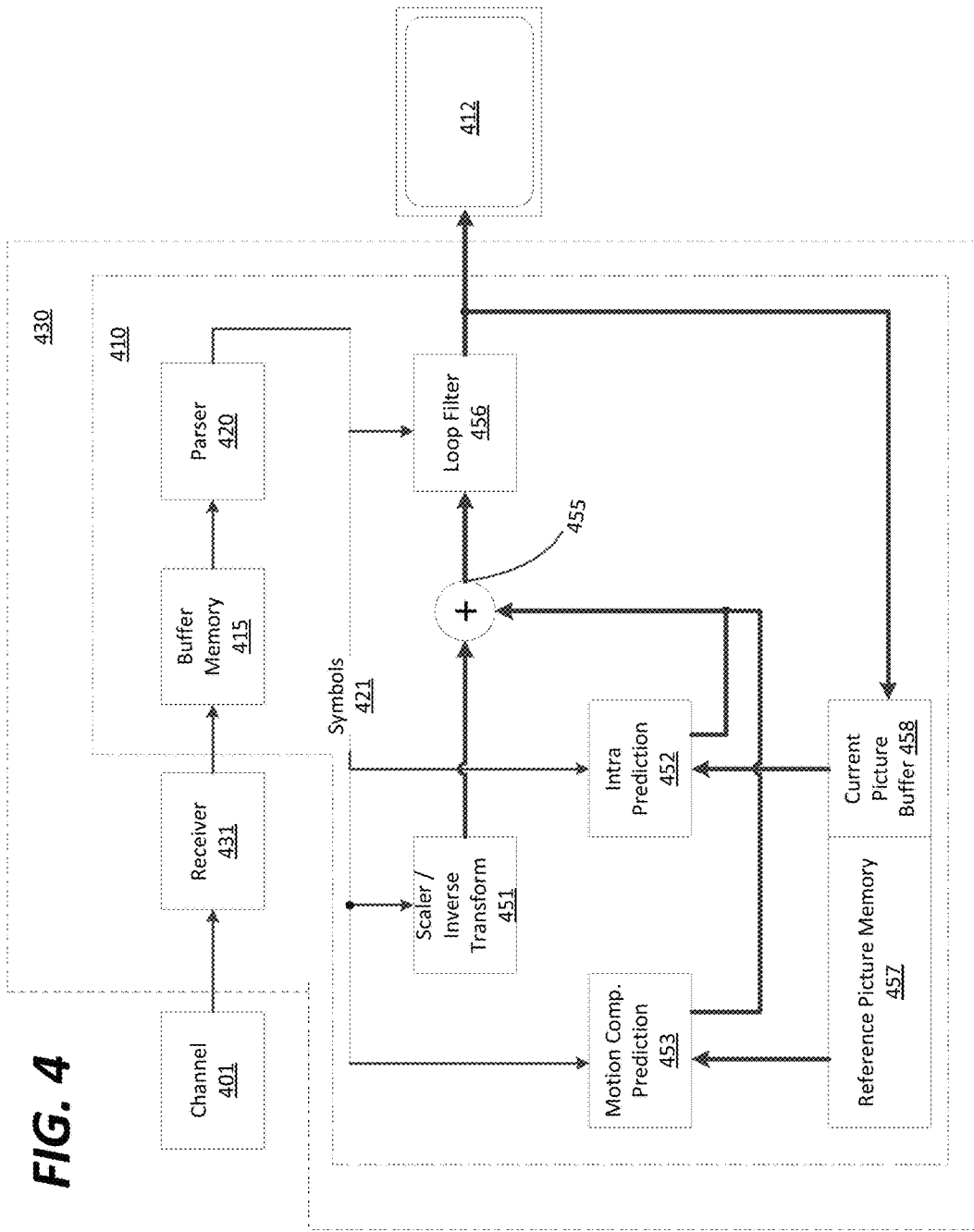
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD)

specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
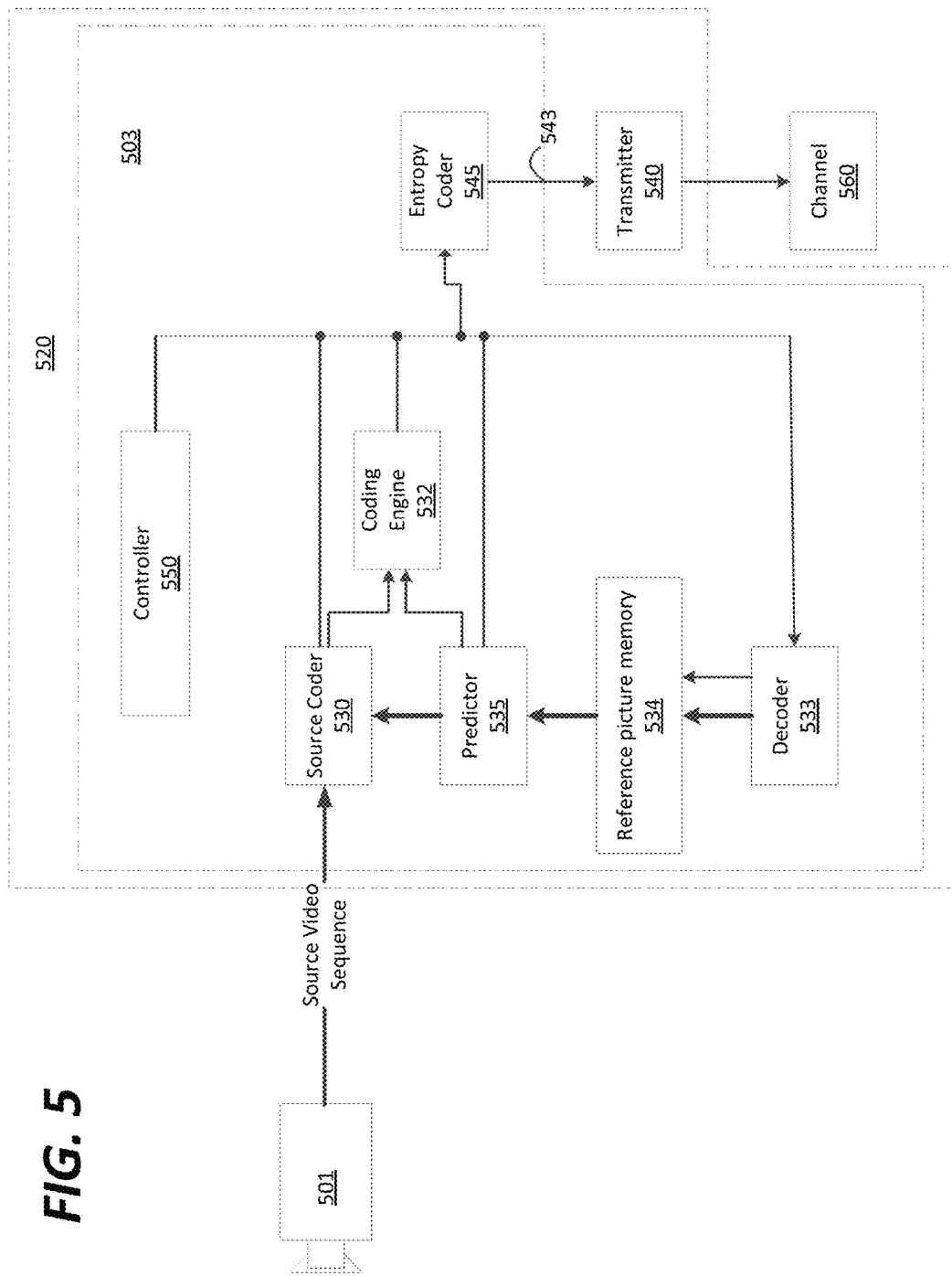
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
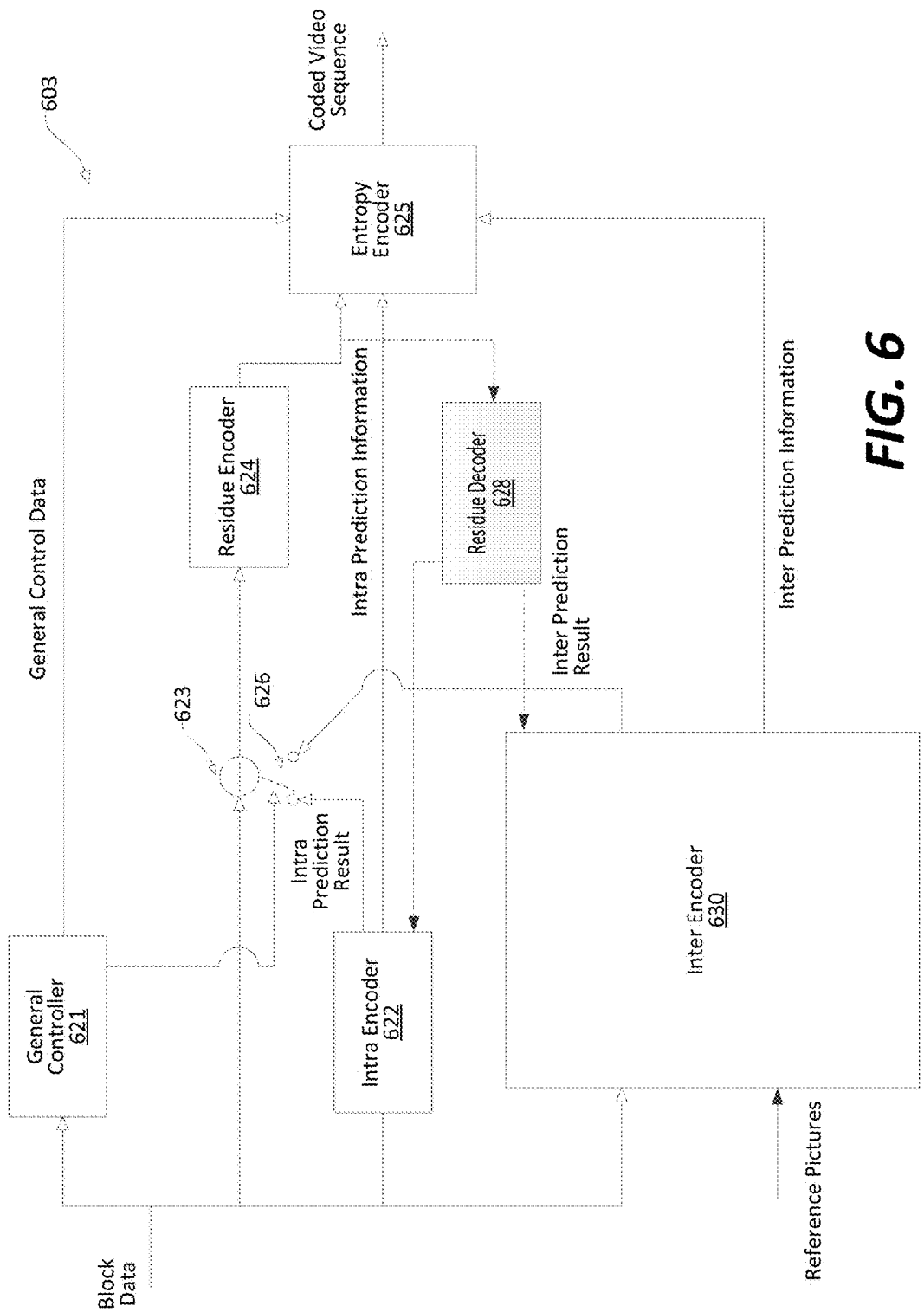
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
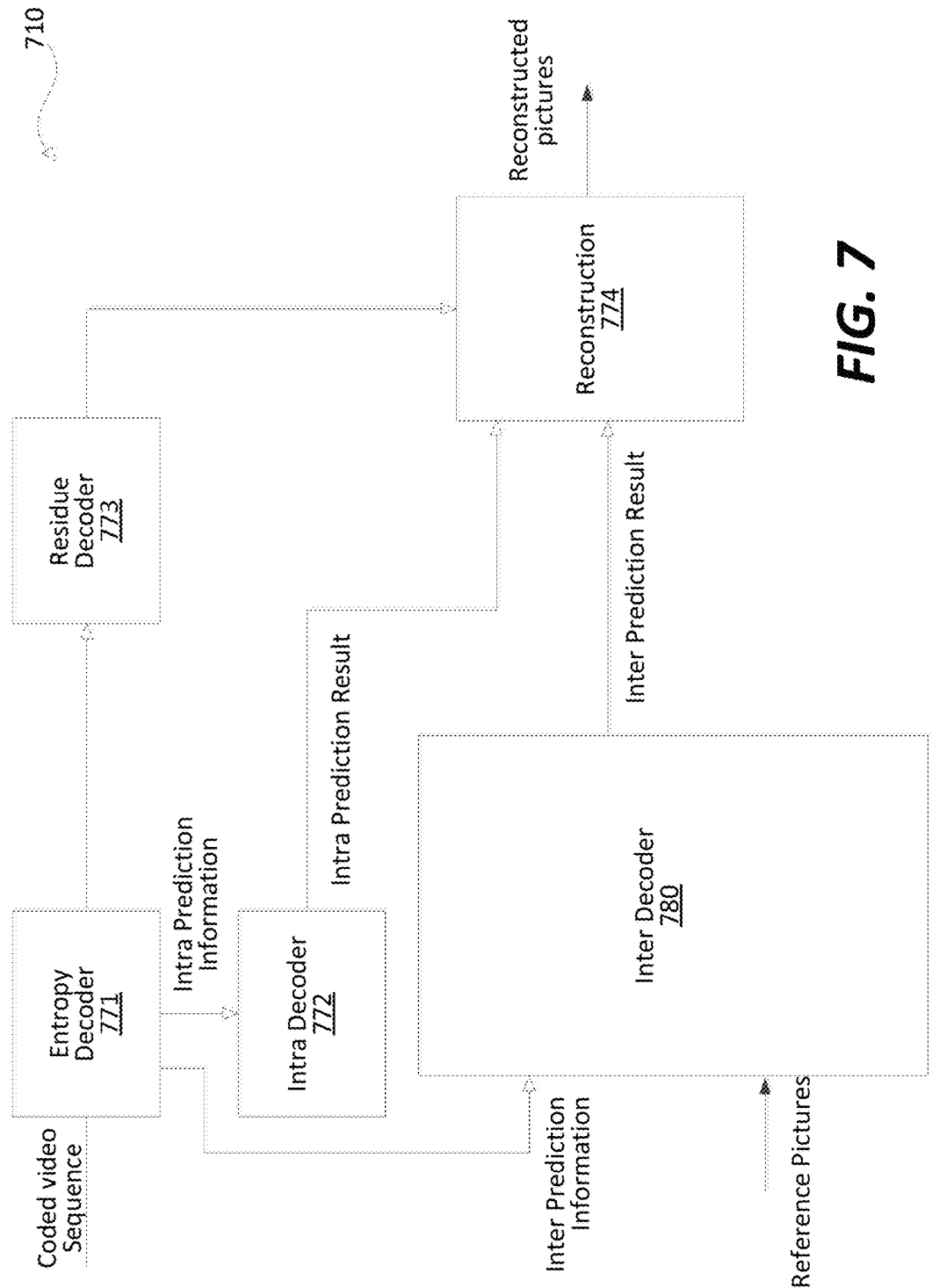
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Aspects of the disclosure provide techniques for constructing ranking-based spatial merge candidate list for inter-picture prediction.

Generally, a motion vector for a block can be coded either in an explicit way, to signal the difference to a motion vector predictor (e.g., advanced motion vector prediction or AMVP mode); or in an implicit way, to be indicated completely from one previously coded or generated motion vector. The later one is referred to as merge mode, meaning the current block is merged into a previously coded block by using its motion information.

Both the AMVP mode and the merge mode construct candidate list during decoding.

Figure 8:
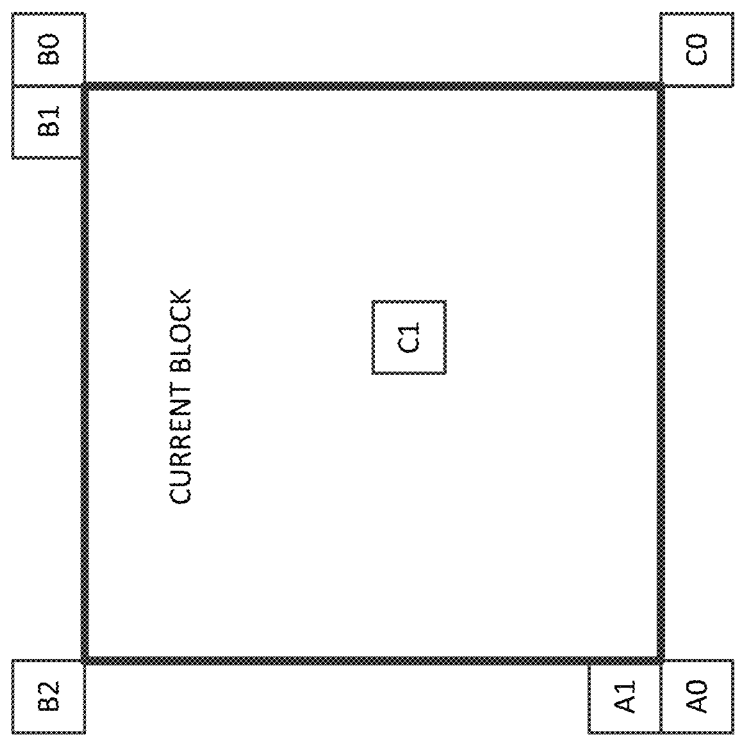
FIG. 8 shows an example of spatial and temporal candidates in some examples.

FIG. 8 shows an example of spatial and temporal candidates in some examples.

For the merge mode in the inter prediction, merge candidates in a candidate list are primarily formed by checking motion information from either spatial or temporal neighboring blocks of the current block. In the FIG. 8 example, candidate blocks A1, B1, B0, A0 and B2 are sequentially checked. When any of the candidate blocks are valid candidates, for example, are coded with motion vectors, then, the motion information of the valid candidate blocks can be added into the merge candidate list. Some pruning operation is performed to make sure duplicated candidates will not be put into the list again. The candidate blocks A1, B1, B0, A0 and B2 are adjacent to corners of the current block, and are referred to as corner candidates.

After spatial candidates, temporal candidates are also checked into the list (merge candidate list). In some examples, the current block's co-located block in a specified reference picture is found. The motion information at C0 position (bottom right corner of the current block) of the co-located block will be used as temporal merge candidate. If the block at this position is not coded in inter mode or not available, C1 position (at the outer bottom right corner of the center of the co-located block) will be used instead.

The advanced motion vector prediction (AMVP) mode in HEVC refers to using spatial and temporal neighboring blocks' motion information to predict the motion information of the current block, while the prediction residue is further coded. Examples of spatial and temporal neighboring candidates are shown in FIG. 8 as well.

In some embodiments, in AMVP mode, a two-candidate motion vector predictor list is formed. For example, the list includes a first candidate predictor and a second candidate predictor. The first candidate predictor is from the first available motion vector from the left edge, in the order of spatial A0, A1 positions. The second candidate predictor is from the first available motion vector from the top edge, in the order of spatial B0, B1 and B2 positions. If no valid motion vector can be found from the checked locations for either the left edge or the top edge, no candidate will be filled in the list. If the two candidates available and are the same, only one will be kept in the list. If the list is not full (with two different candidates), the temporal co-located motion vector (after scaling) from C0 location will be used as another candidate. If motion information at C0 location is not available, location C1 will be used instead.

In some examples, if there are still no enough motion vector predictor candidates, zero motion vector will be used to fill up the list.

In a related art, the order of candidates in the merge list or in the AMVP predictor list is based on a pre-defined pattern, for example, left candidate(s) (e.g., A0 and A1)→top candidate(s) (e.g., B0, B1 and B2)→temporal candidate(s) (e.g., C0 and C1)→ . . . . However, the actual correlation between a spatial/temporal neighbor and the current block may vary depending on the content. The neighboring position with most similar motion information as the current block may not always be the top candidates in the merge list or in the AMVP predictor list.

Aspects of the disclosure provide techniques to further improve MV predictor list in merge mode or AMVP mode. In some embodiments, the MV candidate list is re-ordered according to the correlations between neighboring blocks and the current block. While the following description uses merge mode to illustrate the techniques to re-order the MV candidate list, the techniques can be similarly used in the AMVP mode as well.

Specifically, in some examples, the disclosed methods can identify what are the merge candidate locations to be evaluated, and determine statistics of the merge candidates at the merge candidate locations. Further the disclosed methods can generate a merge candidate list based on the ranking of the statistics of evaluated merge candidates.

In an example, for large blocks or blocks with long sides, more potential merge candidates are available along the long sides of a block. Further, among all available spatial neighboring blocks, multiple candidates can have the same motion information. According to an aspect of the disclosure, the disclosed methods of merge candidate derivation can include additional spatial candidates (e.g., other than A0, A1, B0, B1 and B2) in the candidate list, if the additional spatial candidates are available. The candidate list can be conditionally constructed and pruned with a ranking based method.

The disclosed method may extend the range of spatial neighboring blocks to be considered as merge candidate. Various techniques can be used to select potential merge candidates. Additionally, the merge candidate list construction method can be switched, based on certain conditions, between the original merge candidate list construction method and the proposed ranking based merge candidate list construction.

According to an aspect of the disclosure, additional spatial merge candidates can be included in the merge candidate list. For example, in addition to the spatial merge candidates A0-A1 and B0-B2, new spatial merge candidates may be included into the merge candidate list conditionally. In some examples, the merge candidate list based on the spatial merge candidates A0-A1 and B0-B2 before adding the spatial merge candidates is referred to as the original merge candidate list.

In some embodiments, statistics of spatial merge candidates at block edges are obtained. For example, before constructing the merge candidate list, spatial neighboring blocks are scanned, and the statistics of all or selected available spatial merge candidates are collected. Then, a histogram of the motion information is constructed, based on the count of neighboring blocks with same motion information.

Figure 9:
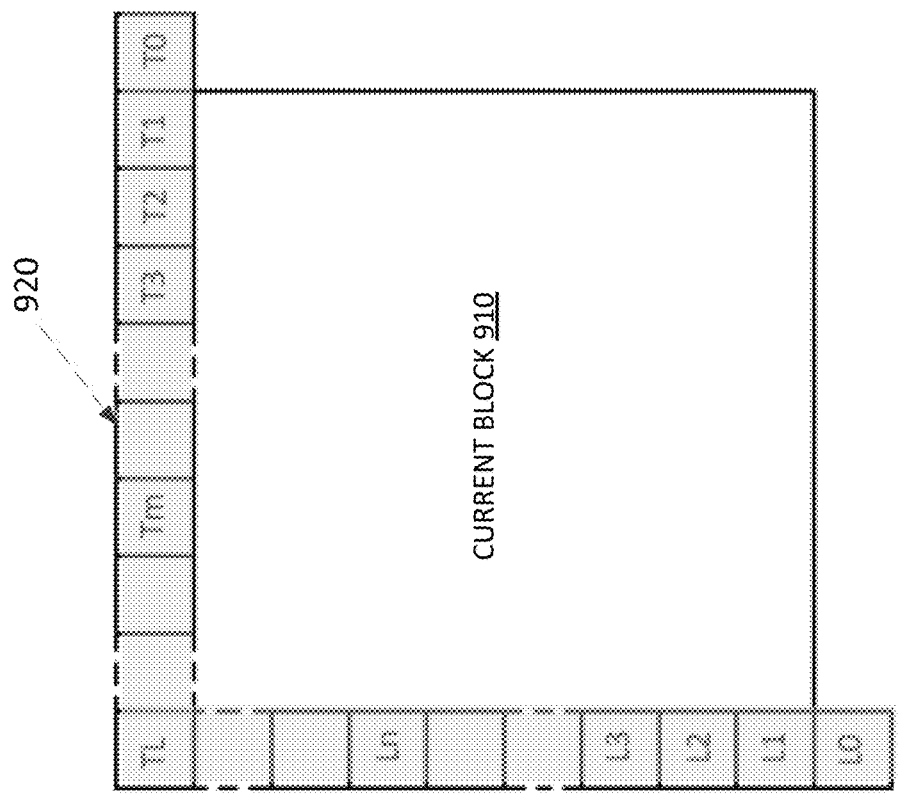
FIG. 9 shows a diagram of potential spatial merge candidates of a current block (910) according to an embodiment of the disclosure.

FIG. 9 shows a diagram of potential spatial merge candidates of a current block (910) according to an embodiment of the disclosure. In some examples, all spatial neighbors with minimum block size (e.g., minimum motion-compensation block, such as 4×4 luma samples) which contain inter prediction information adjacent to the left edge and top edge of current block are scanned (e.g., checked for motion information). In the FIG. 9 example, a first plurality of minimum size blocks (e.g., shown as L1, L2, L3, . . . , Ln, . . . ) that are adjacent to left edge of the current block (910) are scanned. Further, a second plurality of minimum size blocks (e.g., shown as T1, T2, T3, . . . , Tm, . . . ) that are adjacent to a top edge of the current block (910) are scanned. In addition, the bottom-left neighboring block (e.g., shown as L0 in FIG. 9, which corresponds to A0 in FIG. 8), the above-right neighboring block (e.g., shown as T0 in FIG. 9, which corresponds to B0 in FIG. 8), and the above-left neighboring block (e.g., shown as TL in FIG. 9, which corresponds to B2 in FIG. 8), are also scanned. In the FIG. 9 example, the gray colored area (920) includes all the spatial neighboring blocks with minimum block size that are scanned, and the grey colored area (920) is referred to as a scanning range (920) in some examples.

Figure 10:
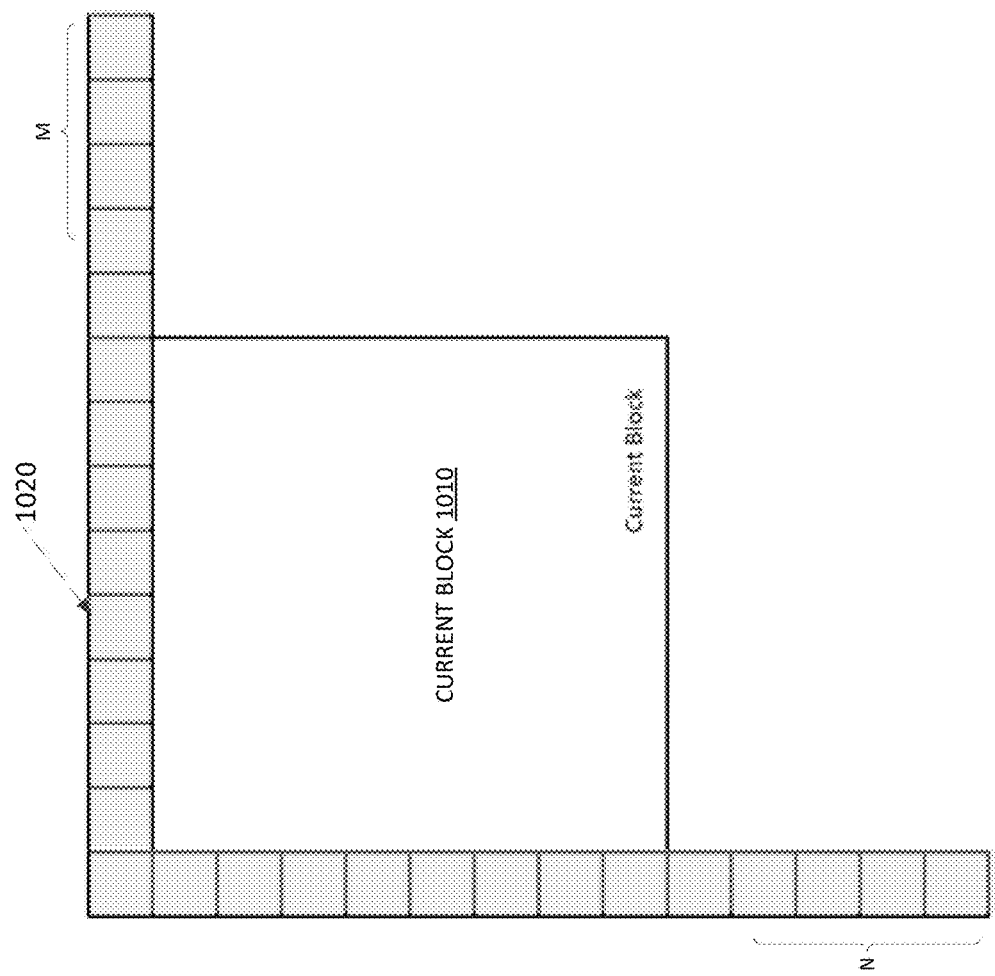
FIG. 10 shows a diagram of potential merge candidates of a current block (1010) according to another embodiment of the disclosure.

FIG. 10 shows a diagram of potential merge candidates of a current block (1010) according to another embodiment of the disclosure. In the FIG. 10 example, potential merge candidates can be spatial candidates adjacent to the current block (1010) and can be extended beyond bottom-left and above-right positions. The grey colored area in FIG. 10 is the scanning range (1020) of the spatial neighbors for the current block (1010) in some examples. The scanning range (1020) of spatial neighbors includes all minimum-sized (e.g., 4×4 luma samples) blocks which are adjacent to the current block (1010), N minimum-sized blocks below the bottom left neighboring block, and M minimum-sized blocks on the right side of the above-right neighboring block. M and N are positive integers, and can be the same integer or different integers.

Figure 11:
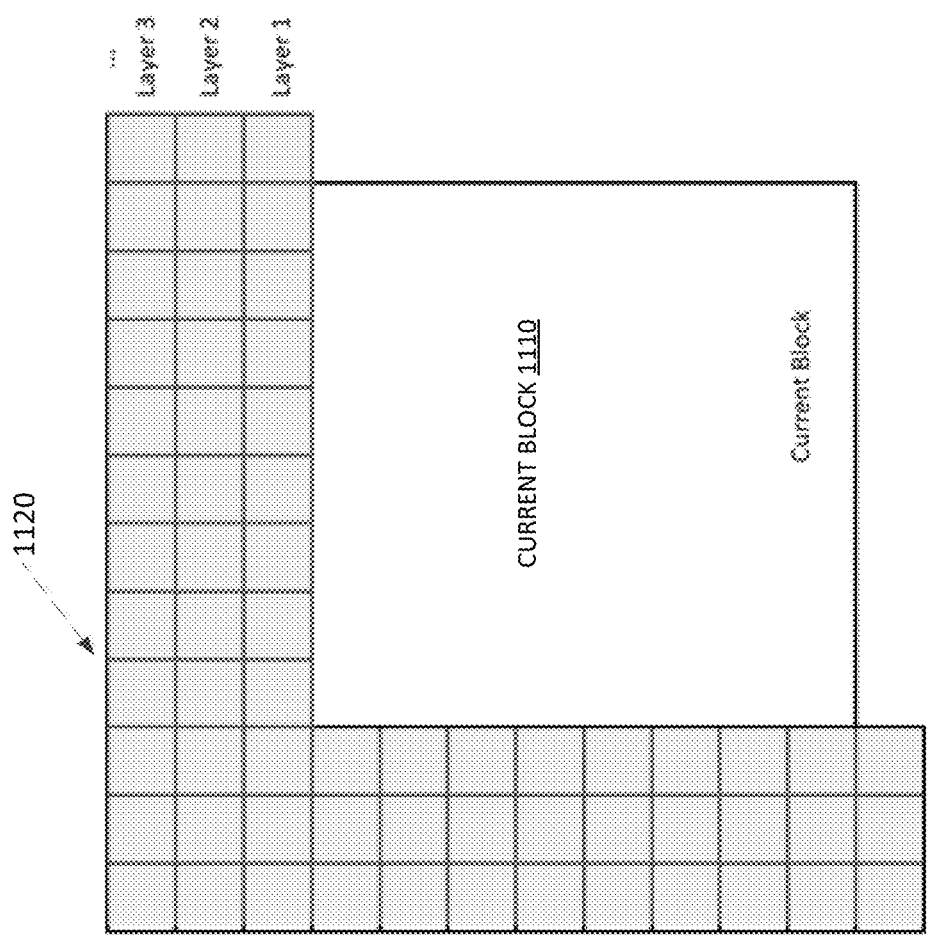
FIG. 11 shows a diagram of potential merge candidates of a current block (1110) according to another embodiment of the disclosure.

FIG. 11 shows a diagram of potential merge candidates of a current block (1110) according to another embodiment of the disclosure. In the FIG. 11 example, potential merge candidates include multiple layers of spatial candidates. The grey colored area in FIG. 11 is the scanning range (1120) of the spatial neighboring blocks for the current block (1110) in some examples. The scanning range (1120) of spatial neighboring blocks is extended to a plurality layers, e.g., layer 1, layer 2 and layer 3, of minimum-sized blocks. The order of layers is from the layer (e.g., layer 1) adjacent to the current block (1110), to the layer (e.g., layer 3) which is farthest away from the current block (1110). The first layer (e.g., layer 1) includes all spatial neighboring blocks with minimum block size which contain inter prediction information adjacent to the left edge and top edge of current block. In addition, the first layer (e.g., layer 1) includes the bottom-left neighboring block, the above-right neighboring block, and the above-left neighboring block. In each of the other layers, all minimum-size blocks adjacent to the previous layer are included. For example, the second layer (e.g., layer 2) includes all minimum size blocks that are adjacent to the blocks in the first layer; and the third layer (e.g., layer 3) includes all minimum size blocks that are adjacent to the blocks in the second layer.

Figure 12:
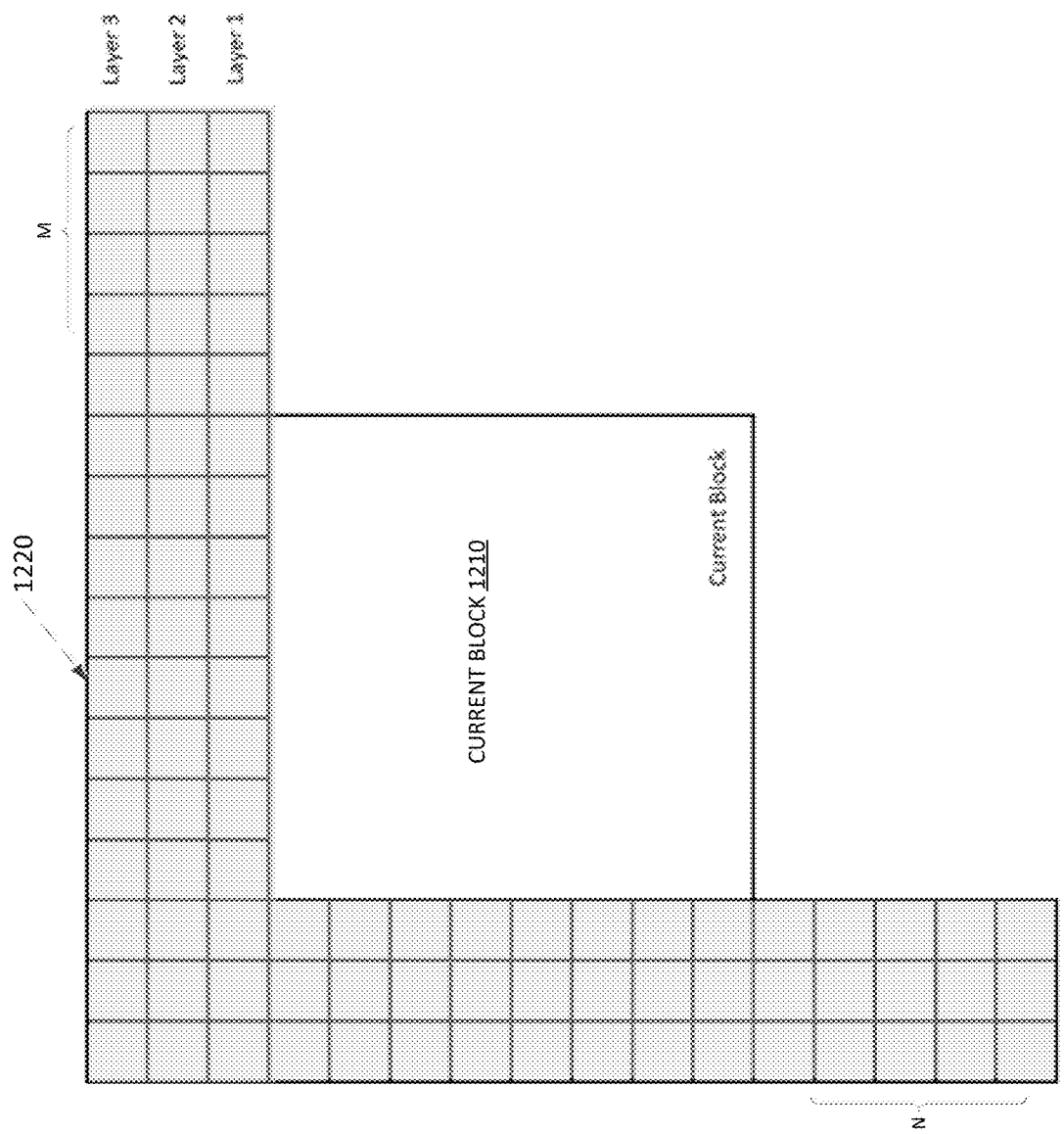
FIG. 12 shows a diagram of potential merge candidates of a current block (1210) according to another embodiment of the disclosure.

FIG. 12 shows a diagram of potential merge candidates of a current block (1210) according to another embodiment of the disclosure. In the FIG. 12 example, potential merge candidates include multiple layers of spatial candidates. The grey colored area in FIG. 12 is the scanning range (1220) of the spatial neighboring blocks for the current block (1210) in some examples. The scanning range (1220) of spatial neighboring blocks is extended to a plurality layers, e.g., layer 1, layer 2 and layer 3, of minimum-sized blocks. The order of layers is from the layer (e.g., layer 1) adjacent to the current block (1210), to the layer (e.g., layer 3) which is farthest away from the current block (1210). The first layer (e.g., layer 1) includes all spatial neighboring blocks with minimum block size which contain inter prediction information adjacent to the left edge and top edge of current block. In addition, the first layer (e.g., layer 1) includes the bottom-left neighboring block and n more candidates below the bottom-left neighboring block, the above-right neighboring block and M more candidate on the right of the above-right neighboring block, and the above-left neighboring block. In each of the other layers, all minimum-size blocks adjacent to the previous layer are included. For example, the second layer (e.g., layer 2) includes all minimum size blocks that are adjacent to the blocks in the first layer; and the third layer (e.g., layer 3) includes all minimum size blocks that are adjacent to the blocks in the second layer.

Figure 13:
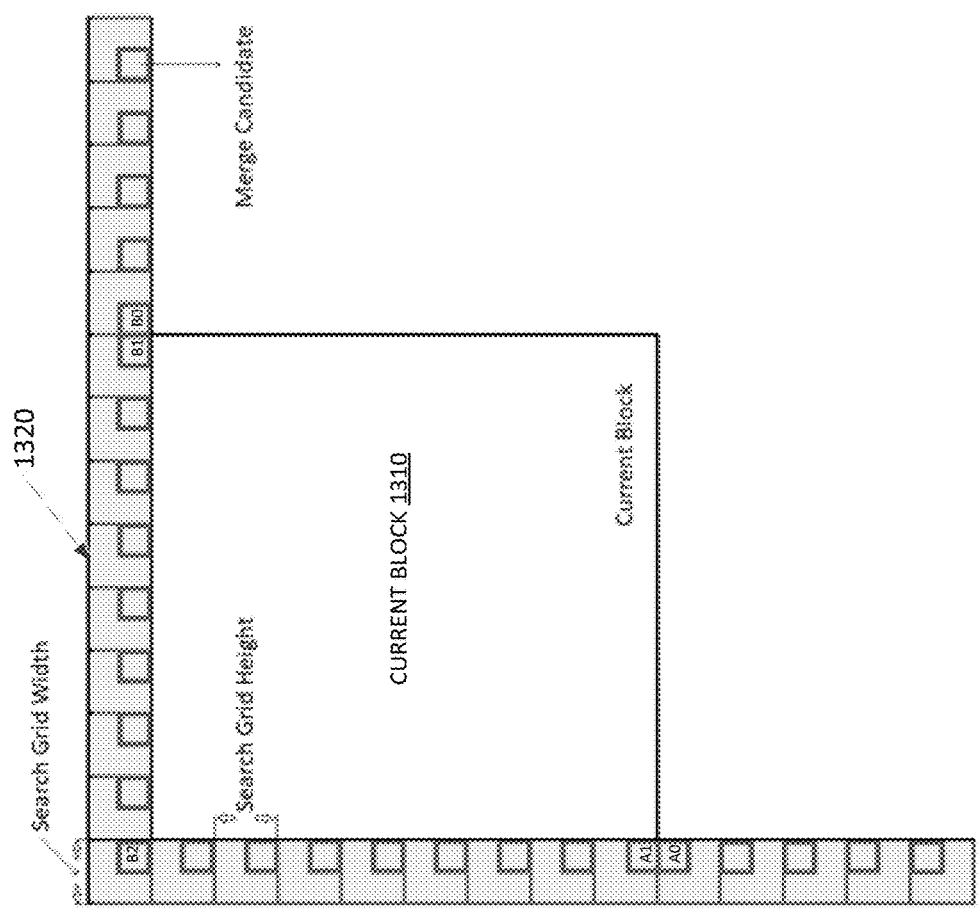
FIG. 13 shows a diagram of potential merge candidates of a current block (1310) according to another embodiment of the disclosure.

FIG. 13 shows a diagram of potential merge candidates of a current block (1310) according to another embodiment of the disclosure. The scanning range (1320) is shown by the grey color area. The scanning (also referred to as search) process is performed according to a grid size (e.g., search grid height in the vertical direction and search grid width in the horizontal direction). The grid size is greater than or equal to minimum block size. When the grid size equals to the minimum block size, the scanning process is similar to the examples in FIG. 9 and FIG. 10 depending on whether the scanning range is extended. In some examples, when the gird size is greater than the minimum block size, for each grid unit, a representative block of the minimum block size is selected for the grid unit as merge candidate.

Figure 14:
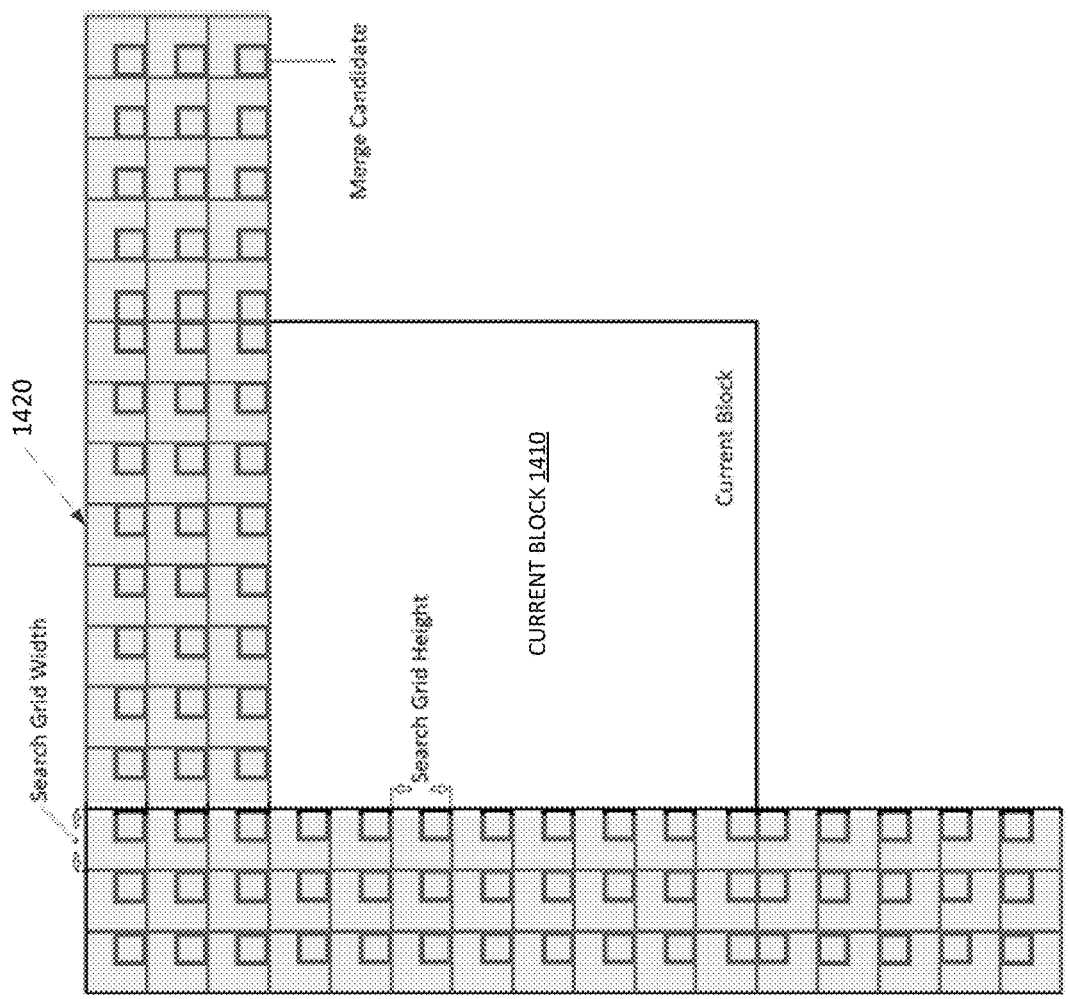
FIG. 14 shows a diagram of potential merge candidates of a current block (1410) according to another embodiment of the disclosure.

FIG. 14 shows a diagram of potential merge candidates of a current block (1410) according to another embodiment of the disclosure. The scanning range (1420) is shown by the grey color area. The scanning range (1420) includes multiple layers of spatial neighboring blocks. The scanning (also referred to as search) process is performed according to a grid size (e.g., search grid height in the vertical direction and search grid width in the horizontal direction). The grid size is greater than or equal to minimum block size. When the grid size equals to the minimum block size, the scanning process is similar to the examples in FIG. 11 and FIG. 12 depending on whether the scanning range is extended. In some examples, when the gird size is greater than the minimum block size, for each grid unit, a representative block of the minimum block size is selected for the grid unit as merge candidate.

In some embodiments, when grid size is used and the width or height of the grid size is larger than the minimum block size, the merge candidate block with minimum block size may be located at a certain location within the grid. In an embodiment, each minimum-sized merge candidate block is located at the bottom right corner of a grid unit, when the grid unit located on the left side of the current block. In another embodiment, each minimum-size merge candidate block is located at the top right corner of a grid unit, when the grid unit is located on the left side of the current block.

In an embodiment, each minimum-sized merge candidate block is located at the bottom left corner of a grid unit, when the grid unit is located on the above side of the current block. In another embodiment, each minimum-size merge candidate block is located at the bottom right corner of a grid unit, when the grid unit is located on the above side of the current block.

In another embodiment, when the candidate block is located on the left of current block and above the bottom-left neighboring block (as A0 in FIG. 13), the minimum-size merge candidate block is located at the bottom right corner of the grid unit. When candidate block is in the same row with or below the bottom-left neighboring block (as A0 depicted in FIG. 13), the minimum-size merge candidate block is located at the top-right corner of the grid unit.

In another embodiment, when the candidate block is located above of current block, when the candidate block is on the left of the above-right neighboring block (depicted as B0 in FIG. 13), the minimum-size merge candidate block is located at the bottom right corner of the grid unit. When candidate block is in the same column with or on the right of the above-right neighboring block (depicted as B0 in FIG. 13), the minimum-size merge candidate block is located at the bottom-left corner of the grid unit.

In another embodiment, when scanning the neighboring minimum-sized blocks, when multiple minimum blocks belong to a same neighboring (prediction) block (e.g. prediction unit) with the same motion information, only one block is counted in the statistics.

According to an aspect of the disclosure, the scanning range of a current block is scanned to obtain motion information of the neighboring blocks. After the scanning process, a histogram of neighboring blocks' motion information is generated.

In an embodiment, the histogram is constructed with one histogram interval (also known as bin) for each individual motion information. Thus, the number of bins corresponds to the number of individual motion vectors, in an example.

In another embodiment, the histogram is constructed with one histogram interval (also known as bin) for a small range of motion information. For example, when motion vector values of two candidates are different by less than 1 pixel, the two candidates can be considered the same and may be counted into one bin. It is noted that the range of motion information in each bin is not limited to the value used in this example. The motion information range based binning process for constructing the histogram also serves as a lossy pruning process.

When the motion information histogram is generated, a sorting process is applied on the bins with non-zero counts. In an embodiment, the motion information candidates are sorted in descending order based on the count of each individual motion information in the scanning range. In another embodiment, the motion information candidates are sorted in ascending order based on the count of each individual motion information.

According to an aspect of the disclosure, a merge candidate list is constructed based on ranking of candidates according to the histogram. In some embodiments, once the candidates are sorted, the first N candidates (N is a positive integer and N<=maximum number of merge candidates) may be added to the merge candidate list in the sorted order.

In an embodiment, N is equal to the maximum number of merge candidates. The generated merge candidate list is the final merge candidate list.

In another embodiment, N is smaller than the maximum number of merge candidates. Other suitable candidates can be added into the remaining entries of the merge candidate list. For example, the temporal merge candidate can be added into the merge candidate list. In another example, artificial merge candidates, such as combined bi-prediction merge candidates, or zero valued merge candidates can be added into the merge candidate list.

In another embodiment, the first N candidates on the sorted list may be inserted with other merge candidates, such as temporal merge candidates, combined bi-prediction merge candidates, and zero valued merge candidates, until the total number of candidates equal to the maximum merge candidates.

According to an aspect of the disclosure, the ranking based merge candidate list is constructed when certain conditions are satisfied. When the certain conditions are not satisfied, the video coding process can switch back to the original merge candidate list. The switching based on the certain conditions between the original merge candidate list and the ranking based merge candidate list is referred to as conditional switching between the original merge candidate list and the ranking based merge candidate list.

The conditional switching is based on a size (e.g., a width of the block, a height of the block) of the current block. In an example, when the width and height of the current block are both smaller than a threshold (e.g., 8 pixels), the original merge candidate list (e.g., defined by HEVC standard) is constructed and used. When the width or height of current block is larger than the threshold (e.g., 8 pixels), the ranking based merge candidate list is constructed and used in video encoding/decoding. It is noted that the threshold is not limited to the value used in this example. The threshold can be any width or height which is smaller than the maximum block width or height.

In an embodiment, only the ranking based merge candidate is constructed and used.

In another embodiment, the conditional switching is used to determine whether certain conditions are satisfied in order to construct the original merge candidate list or to construct the ranking based merge candidate list.

Figure 15:
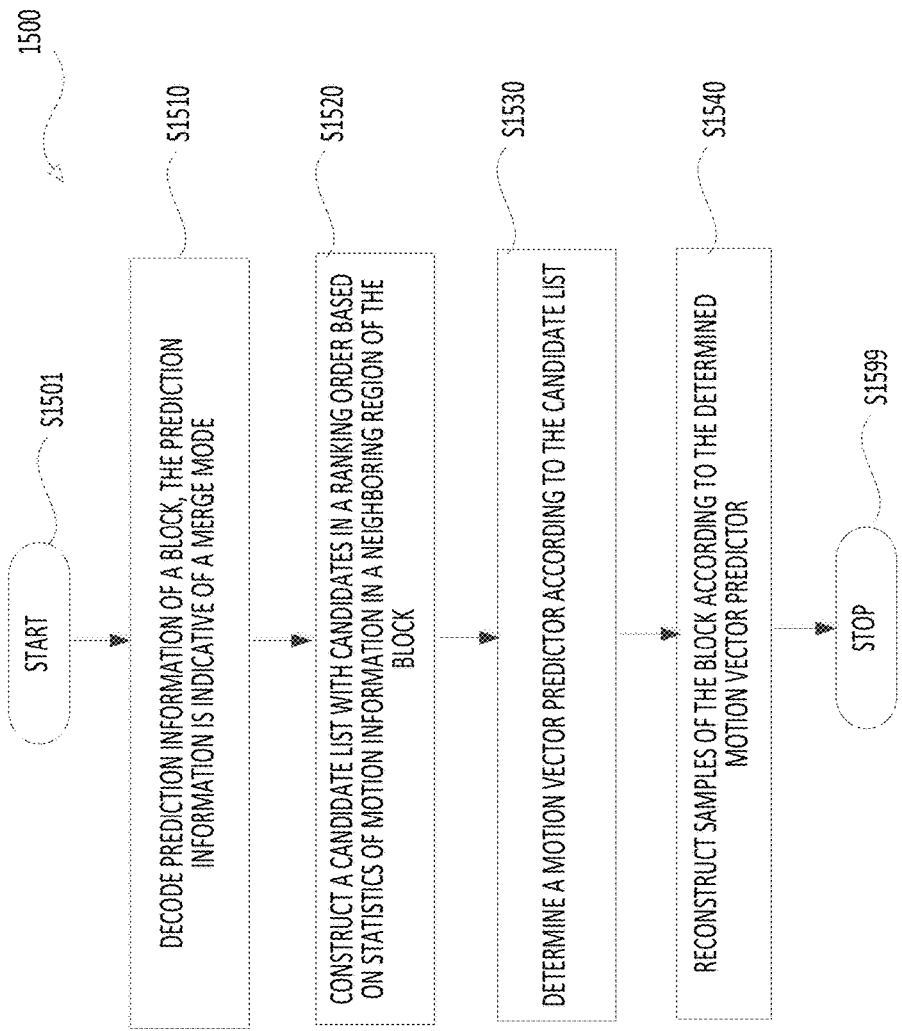
FIG. 15 shows a flow chart outlining a process (1500) according to an embodiment of the disclosure.

FIG. 15 shows a flow chart outlining a process (1500) according to an embodiment of the disclosure. The process (1500) can be used in the reconstruction of a block coded in intra mode, so to generate a prediction block for the block under reconstruction. In various embodiments, the process (1500) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the intra prediction module (452), the processing circuitry that performs functions of the video encoder (503), the processing circuitry that performs functions of the predictor (535), the processing circuitry that performs functions of the intra encoder (622), the processing circuitry that performs functions of the intra decoder (772), and the like. In some embodiments, the process (1500) is implemented in software instructions, thus when the processing circuitry executes the software instructions, the processing circuitry performs the process (1500). The process starts at (S1501) and proceeds to (S1510).

At (S1510), prediction information of a block in a current picture is decoded from a coded video bitstream. The prediction information is indicative of an inter prediction mode, such as a merge mode, a skip mode, and the like that determines a motion vector for the block from a motion vector predictor.

At (S1520), a candidate list is constructed in response to the inter prediction mode. The candidate list includes a plurality of motion vector predictors arranged with a ranking order. The motion vector predictors are sorted to have the ranking order based on statistics of motion information in a spatial neighboring region of the block, such as disclosed with reference to FIG. 9-FIG. 14.

At (S1530), a motion vector predictor is determined from the candidate list according to the ranking order.

At (S1540), samples of the block are reconstructed according to the motion vector predictor. Then, the process proceeds to (S1599) and terminates.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
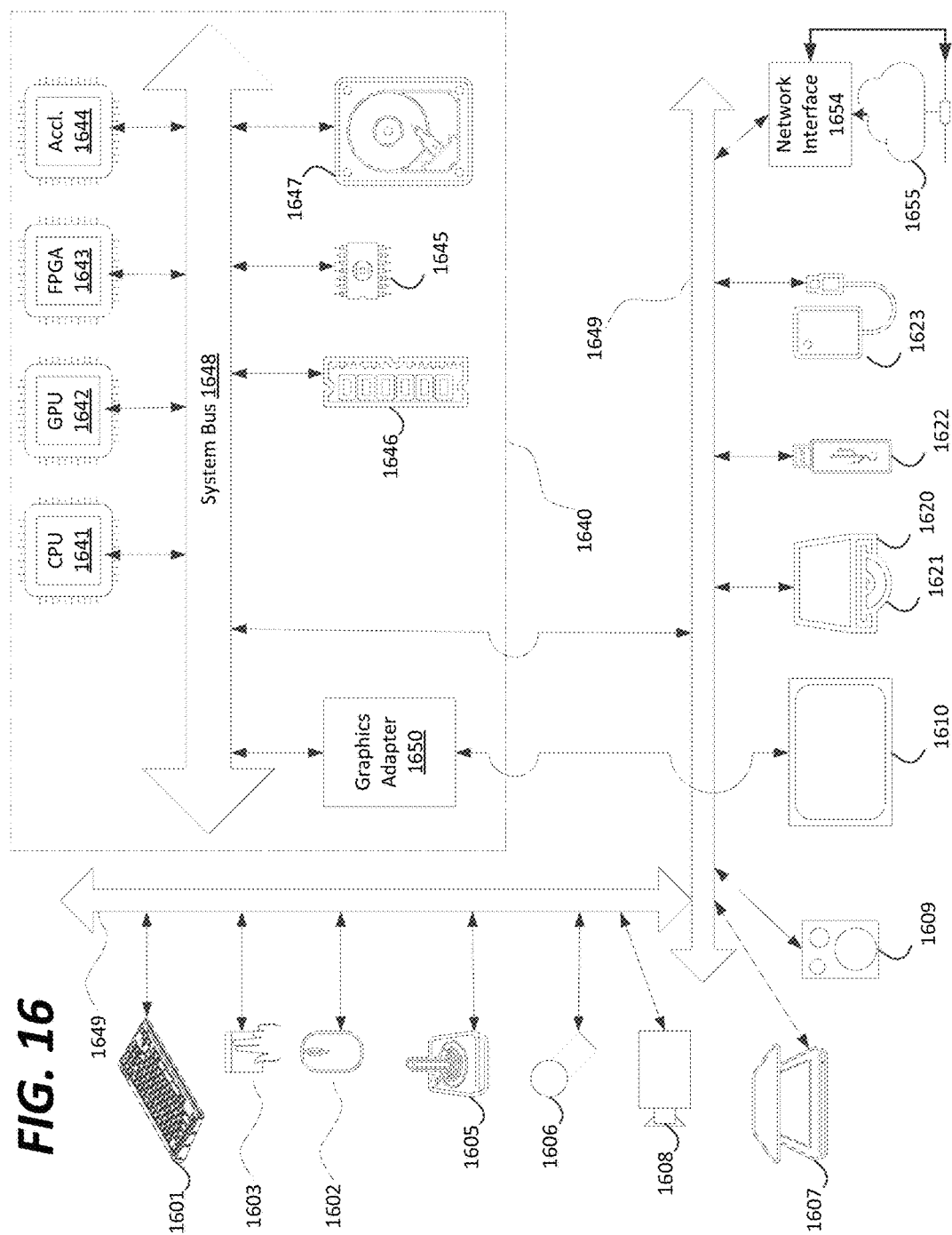
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hard-wired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
    decoding prediction information for a current block in a current picture from a coded video bitstream, the prediction information being indicative of an inter prediction mode;
    scanning a line of blocks in a spatial neighboring region of the current block to collect statistics of motion information in the spatial neighboring region, the line of blocks including adjacent blocks to the current block and at least one non-adjacent block to the current block;

constructing, in response to the inter prediction mode and if the current block satisfies at least one of a width requirement and a height requirement, a candidate list of candidate motion vector predictors in a ranking order that are sorted based on the statistics of the motion information in the spatial neighboring region of the current block;

determining a motion vector predictor from the candidate list following the ranking order; and reconstructing at least a sample of the current block according to motion information associated with the determined motion vector predictor.

2. The method of claim 1, wherein the scanning comprises:

scanning neighboring blocks in the spatial neighboring region to collect the statistics of the motion information in the spatial neighboring region.

3. The method of claim 1, wherein the scanning comprises:

scanning minimum-size blocks in the spatial neighboring region to collect the statistics of the motion information in the spatial neighboring region.

4. The method of claim 1, wherein the scanning comprises:

scanning minimum-size blocks that are adjacent to the current block to collect the statistics of the motion information in the spatial neighboring region.

5. The method of claim 1, wherein the scanning includes scanning first minimum-size blocks that are located in a left column next to the current block and are extended in a bottom-left direction; and the method further includes scanning second minimum-size blocks that are located in an upper row next to the current block and are extended in an above-right direction to collect the statistics of the motion information in the spatial neighboring region.

6. The method of claim 1, wherein the scanning includes scanning first minimum-size blocks that are located in multiple left columns next to the current block and are extended in a bottom-left direction to collect the statistics of the motion information in the spatial neighboring region; and the method further includes scanning second minimum-size blocks that are located in multiple upper rows next to the current block and are extended in an above-right direction to collect the statistics of the motion information in the spatial neighboring region.

7. The method of claim 1, wherein the scanning comprises:

scanning representative minimum-size blocks respectively in grid units that are adjacent to the current block to collect the statistics of the motion information in the spatial neighboring region.

8. The method of claim 1, wherein the scanning includes scanning first representative minimum-size blocks respectively in first grid units that are located in a left column next to the current block and are extended in a bottom-left direction to collect the statistics of the motion information in the spatial neighboring region; and the method further includes scanning second representative minimum-size blocks respectively in second grid units that are located in an upper row next to the current block and are extended in an above-right direction to collect the statistics of the motion information in the spatial neighboring region.

9. The method of claim 1, wherein the scanning includes scanning first representative minimum-size blocks respectively in first grid units that are located in multiple left columns, including the line of blocks, next to the current block and are extended in a bottom-left direction to collect the statistics of the motion information in the spatial neighboring region; and the method further includes scanning second representative minimum-size blocks respectively in second grid units that are located in multiple upper rows next to the current block and are extended in an above-right direction to collect the statistics of the motion information in the spatial neighboring region.

10. The method of claim 2, further comprising:

constructing a histogram of the motion information in the spatial neighboring region according to the statistics; and sorting motion vector predictors from the spatial neighboring region into the ranking order according to the histogram.

11. The method of claim 10, further comprising:

constructing the histogram with bins corresponding to individual motion vectors.

12. The method of claim 10, further comprising:

constructing the histogram with bins corresponding to ranges of motion vectors.

13. The method of claim 10, further comprising:

selecting a portion of the sorted motion vector predictors based on rankings in the ranking order.

14. An apparatus for video decoding, comprising:

processing circuitry configured to:

decode prediction information for a current block in a current picture from a coded video bitstream, the prediction information being indicative of an inter prediction mode;

scan a line of blocks in a spatial neighboring region of the current block to collect statistics of motion information in the spatial neighboring region, the line of blocks including adjacent blocks to the current block and at least one non-adjacent block to the current block;

construct, in response to the inter prediction mode and if the current block satisfies at least one of a width requirement and a height requirement, a candidate list of candidate motion vector predictors in a ranking order that are sorted based on the statistics of the motion information in the spatial neighboring region of the current block;

determine a motion vector predictor from the candidate list following the ranking order; and reconstruct at least a sample of the current block according to motion information associated with the determined motion vector predictor.

15. The apparatus of claim 14, wherein the processing circuitry is further configured to:

perform the scan on neighboring blocks in the spatial neighboring region to collect the statistics of the motion information in the spatial neighboring region.

16. The apparatus of claim 14, wherein the processing circuitry is further configured to:

perform the scan on minimum-size blocks in the spatial neighboring region to collect the statistics of the motion information in the spatial neighboring region.

17. The apparatus of claim 15, wherein the processing circuitry is further configured to:
  construct a histogram of the motion information in the spatial neighboring region according to the statistics; and
  sort motion vector predictors from the spatial neighboring region into the ranking order according to the histogram.

18. The apparatus of claim 17, wherein the processing circuitry is further configured to:
  select a portion of the sorted motion vector predictors based on rankings in the ranking order to construct the candidate list.

\* \* \* \* \*